United States Patent
Beer

[11] 3,772,179
[45] Nov. 13, 1973

[54] CATHODIC PROTECTION DEVICE
[76] Inventor: Ernst Beer, Zorgvlietstraat 176, The Hague, Netherlands
[22] Filed: Mar. 17, 1971
[21] Appl. No.: 125,393

Related U.S. Application Data
[62] Division of Ser. No. 825,915, May 19, 1969, abandoned.

[52] U.S. Cl. .............. 204/197, 85/10 F, 204/286, 204/297 M, 248/206 A, 339/95 R
[51] Int. Cl. ............................................. C23f 13/00
[58] Field of Search .................. 85/10 F; 339/95 R; 248/206 A; 204/148, 197, 286, 297 M

[56] References Cited
UNITED STATES PATENTS

| | | | |
|---|---|---|---|
| 2,045,547 | 6/1936 | Chatfield | 204/197 |
| 2,081,047 | 5/1937 | Basch | 204/197 |
| 2,203,294 | 6/1940 | Engle | 85/10 F |
| 3,060,112 | 10/1962 | Shomber | 204/197 |
| 3,513,082 | 5/1970 | Beer et al. | 204/197 |
| 3,553,094 | 1/1971 | Scott et al. | 204/197 |
| 3,574,080 | 4/1971 | Jones et al. | 204/148 |

OTHER PUBLICATIONS
A.P.C. Application of Hilpert, SN 383,003, Pub. 5-18-43, abandoned.

Primary Examiner—T. Tung
Attorney—E. F. Wenderoth et al.

[57] ABSTRACT

A device for protection of a ferromagnetic body against corrosion when it is in corrosive conditions. A permanent magnet assembly has pole shoes for detachably attaching the magnetic assembly onto the body to be protected by attractive magnetic force. Electrically conductive metal supporting means are mounted on the magnetic assembly and are electrically insulated therefrom, and include a spring member having a pointed contacting member adapted to be urged by the spring member towards the body so as to penetrate into the body to establish a low-resistance electrical connection between the supporting means and the body. The metal supporting means further has a mounting structure including a clamp and clamping screw for electrically conductively mounting a sacrificing anode by detachably clamping in the clamp by the clamping screw. An anode supporting rod is embedded in the active material of the sacrificing anode. The clamping screw is pointed so as to penetrate into the anode supporting rod to establish an electrical low-resistance connection between the supporting means and the sacrificing anode. At least the poleshoe surfaces adjacent the body, the pointed contacting member, and the thread and point of the clamping screw are coated with a softer metal than the metal of said body to be protected, the hardness of the softer metal being less than half the hardness of the metal on which it is coated.

6 Claims, 4 Drawing Figures

Patented Nov. 13, 1973
3,772,179
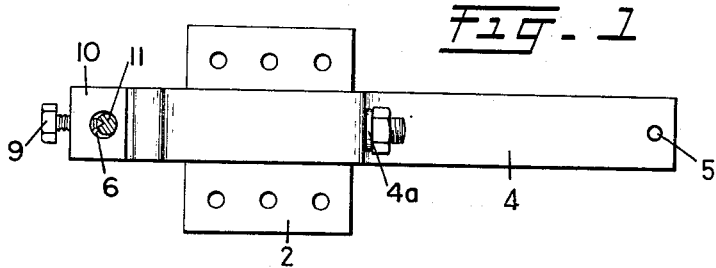
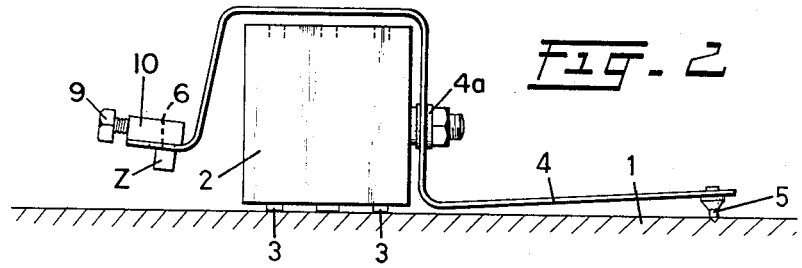
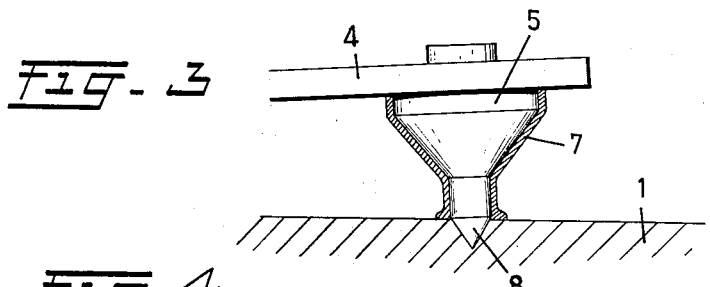
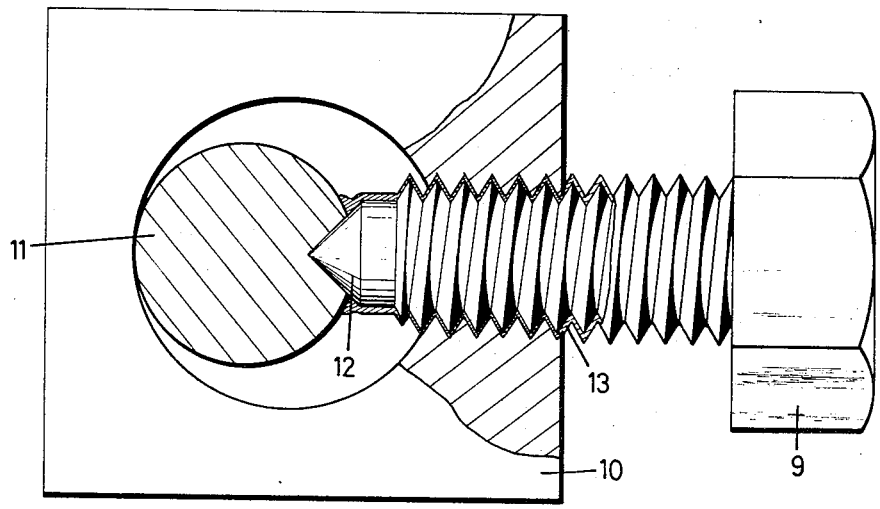
ERNST BEER,
INVENTOR.
BY Wenderoth, Lind & Ponack
ATTORNEYS

CATHODIC PROTECTION DEVICE

This application is a division of application Ser. No. 825,915, filed May 19, 1969 now abandoned.

The present invention relates to a device for the protection of a ferromagnetic body against corrosion which includes improved means for connecting the surfaces of two metal bodies to each other under a constant pressure.

It is known to realize an electric connection by pressing two metal bodies one on the other by means of springs, bolts and nuts, a magnetic field or pneumatically. The welding together or soldering to accomplish a contact of this kind may be left out of consideration in this specification, because the present invention merely aims at an improvement for the first-mentioned type of connections, viz., the non-permanent or detachable connections.

This group of non-permanent contacts is a very important one, for it is often desirable in systems, like those for cathodic protection, etc., that the parts can be readily exchanged; therefore, welding and soldering are excluded.

It has often been suggested to mount, for example, the anodes for cathodic protection on the article to be protected by means of bolts and nuts or magnets to facilitate the exchange of parts to a high extent. However, in doing so, the difficulty was encountered that corrosion prevented a good electric contact. Practically, it turned out to be impossible to polish two metal bodies, such as a ship's side and the anode connector, so smoothly as to avoid the entry thereinbetween of moisture or electrolyte. Owing to this, corrosion would occur which in the end disturbs the electric contact and considerably reduces a reliable operation of the structure.

Attempts have been made to obviate this drawback by means of existing sealing materials, but they failed because these materials are insulative and impede the transfer of electricity, so that the electric contact was at least partly disturbed. On the other hand, for practical reasons metal foil packings are useless, because the pressure required for these packings to conform to the shape to cover the connecting members completely is too high for those parts with which the subject invention is concerned.

The object of this invention is to solve these problems. It has, accordingly, surprisingly been found that when soft metals, such as lead, tin, indium, zinc, etc., or alloys of these metals, provided the maximum hardness of these metals does not exceed a value of 2.5 of Mohs' scale of hardness, are applied on to at least one of the bodies of the structure with a layer thickness of no more than 1.5 mm, a light pressure is sufficient to realize an absolutely sealing and electrically conductive connection between such body and another metal body which is untreated. The surprising aspect of this invention is that, for example, a lead foil of the same thickness, inserted between these two metal bodies, at the same pressure or a pressure considerably higher, cannot effect a perfect seal against creeping electrolyte. If, however, this lead is applied, in accordance with the invention, as an adhesive layer on one of the bodies that are to be clamped together, a perfect sealing is obtained. The hardness ratio of the soft sealing metal or the alloy to the hard metal body on which it is applied should be at least 1:2, based on Mohs-units of hardness. The soft sealing metal should also be softer than the other hard metal body.

Coating at least one of the abutting metal bodies with the soft sealing metal or the alloy may be effected galvanically, thermally or in any other known manner. Galvanic deposition is preferred, however, because in it, by current setting, the nature of the electrolyte and the temperature, deposits can be obtained which, due to hydrogen absorption, are voluminous and considerably softer than when these metals are formed by, say, melting. As a result, under light pressure the shape of the uncoated body is readily formed in the coating of the other body which is pressed against the uncoated body and an ideal sealing is obtained, preventing the creepage of electrolyte, and thus corrosion. While the electric connection is retained for a long time.

The object of the invention is achieved by providing a device for protection of a ferromagnetic body against corrosion when it is in corrosive conditions. The device comprises a permanent magnet assembly having pole shoes for detachably attaching said magnetic assembly onto the body by attractive magnetic force. Electrically conductive metal supporting means are mounted on said magnetic assembly and electrically insulated therefrom, and include a spring member having a pointed contacting member adapted to be urged by said spring member towards said body so as to penetrate into said body to establish a low-resistance electrical connection between said supporting means and said body. The metal supporting means further has a mounting structure including a clamp and clamping screw for electrically conductively mounting a sacrificing anode by detachably clamping in said clamp by said clamping screw, an anode supporting rod being embedded in the active material of the sacrificing anode. The clamping screw is pointed so as to penetrate into the anode supporting rod to establish an electrical low-resistance connection between said supporting means and said sacrificing anode. At least the poleshoe surfaces adjacent said body, said pointed contacting member, and the thread and point of said clamping screw are coated with a softer metal than the metal of said body to be protected, the hardness of the softer metal being less than half the hardness of the metal on which it is coated.

The invention will now be illustrated with reference to the accompanying drawings wherein some embodiments of the invention are shown. It is to be understood that these embodiments are illustrative only and do not limit the scope of the invention. In the drawings:

FIG. 1 is a plan view of a system for securing a consuming anode to a steel article, such as a ship's side;

FIG. 2 is a side elevation of the same system, showing only one surface of the article to be protected;

FIG. 3 is a detailed view of the system shown in the preceding drawings, viz., a sectional view of the point screw contact; and FIG. 4 shows a connection of parts of the system of FIG. 1, with a threaded bolt.

Referring to the drawings, FIGS. 1–3 diagrammatically show how a zinc anode is secured to a ship's side 1 by means of magnets 2. These magnets 2 consist of ceramic magnet rings with steel pole shoes 3 thereinbetween. These pole shoes 3 are pressed against the article 1 to be protected, for example, the ship's side, by the magnetic force. The zinc anode Z is mounted on these magnets by metal supporting means comprised of a spring member 4 mounted on magnets 2 by an electric insulator 4a so as to be electrically insulated therefrom, the spring member 4 having a pointed screw 5 thereon, said spring 4 being in electrically conductive contact with the zinc at the location 6. In its fresh state this structure has a resistance of less than 0.01 Ohm for the cathodic protection current. After the electrolyte has been active on the structure for some time and corrosion owing to crept electrolyte has become manifest, this resistance may rise to 10 Ohms and more, which causes the satisfactory operation to cease.

If, however, at least in the places of contact in the electric circuit, the corrosion-susceptible parts, such as the steel pole shoes, the bolts, the spring screw and the point screw, are coated, according to this invention, with a soft metal, such as lead, tin, or an alloy thereof, the initial resistance of 0.01 Ohm is retained for a very long time, resulting in a complete cathodic protection, while avoiding corrosion owing to drawn up or penetrating electrolyte.

The reason for this is that, by virtue of the pressure exerted adjacent the contacts on the members coated with soft metal, perfectly abutting contact surfaces are obtained which prevent the entry of corrosive electrolyte.

It is shown in FIG. 3 how this sealing forms adjacent the pointed screw. The soft metal layer 7, which at first covers the entire pointed screw 5, is stripped off the point as the point 8 penetrates the side 1 and forms a sealing collar about the contact connection.

Another example is one of a metallic structure in seawater, to which magnesium anodes are attached for the purpose of cathodic protection. These anodes are attached by means of clamps in which on one side threaded openings are formed to permit the contact with the mounting member of the magnesium anodes by means of pointed screws, whereas in the other side of these clamps threaded slots are formed into which pointed screws are driven, serving to fix the clamps on, for example, the iron ribs of the structure to be protected.

A connection of this kind is diagrammatically shown in FIG. 4. A bolt or damping screw 9 is to make an electrically conductive connection between two metal bodies 10 and 11, the body 10 in FIG. 1 forming part of the member 4 and acting as a clamp, and the body 11 being a rod embedded in the zinc anode Z as in FIG. 1, or vice versa. The bolt has a point 12 by which it can penetrate body 11.

So long as a connection of this kind is fresh it works excellently, but after a short time corrosion will manifest itself between the pointed screw and the body 11, and in the screwthread of the bolt 9 in body 10. All of these corroded contact surfaces are going to form such a high resistance to the electrolysis current that a cathodic protection is almost out of the question. Besides, the mechanical strength of such a clamping connection is adversely affected by corrosion, to a high extent.

If, however, the bolt 9 with the point 12 is coated, according to this invention, galvanically or thermally with a layer 13 of soft metal, such as lead, tin or an alloy, such as a lead/tin alloy, the good operation will be ensured for a practically unlimited period of time.

The layer of soft metal on the structure forms a perfect seal in the thread to resist penetrating electrolyte, as a result of the pressure generated by tightening the bolt. To form this seal, it is advantageous if the thread of the bolt 9 fits the thread of the body 10 with some play. Also, as a result of the pressure generated by tightening, the points of the screws driven into body 11 cause the surfaces to be in perfect abutting relationship with each other and form sealing metal collars, preventing any corrosion between these parts because of the deformation of the soft metal according to the invention.

The soft metal can be applied on to the desired surfaces in a galvanic bath which, owing to (a) an unduly high current density, (b) an excessively high temperature, and (c) an unduly low pH or a lack of metal compounds, produces deposits which have a spongy metallurgical structure such that the hardness is at least 20 percent less than if a foil would be composed in the known manner. This will be referred to as "apparent hardness." Lead, for example, has the values, according to Mohs' scale of hardness: normal foil 1.5; according to the invention 1.2.

In the examples given, it may, for practical reasons, be simpler to apply a soft metal layer to both one and the other metal body.

What is claimed is:

1. A device for protection of a ferromagnetic body against corrosion when it is in corrosive conditions, comprising a permanent magnet assembly having pole shoes for detachably attaching said magnetic assembly onto the body by attractive magnetic force, electrically conductive metal supporting means mounted on said magnetic assembly and electrically insulated therefrom, and including a spring member having a pointed contacting member adapted to be urged by said spring member towards said body so as to penetrate into said body to establish a low-resistance electrical connection between said supporting means and said body, said metal supporting means further having a mounting structure including a clamp and clamping screw for electrically conductively mounting a sacrificing anode by detachably clamping in said clamp by said clamping screw, an anode supporting rod embedded in the active material of the sacrificing anode, said clamping screw being pointed so as to penetrate into the anode supporting rod to establish an electrical low-resistance connection between said supporting means and said sacrificing anode, at least the poleshoe surfaces adjacent said body, said pointed contacting member, and the thread and point of said clamping screw being coated with a softer metal than the metal of said body to be protected, the hardness of the softer metal being less than half the hardness of the metal on which it is coated.

2. A device as claimed in claim 1 in which the metal coating has a metallurgical structure having an apparent hardness at least 20 percent less than the hardness of the metal when it is in normal foil form.

3. A device as claimed in claim 1 in which the hardness of said layer of metal is less than 2.5 on the Moh scale.

4. A device as claimed in claim 3 in which the metal coating has a metallurgical structure having an apparent hardness at least 20 percent less than the hardness of the metal when it is in normal foil form.

5. A connection as claimed in claim 3 in which said layer of metal is a metal taken from the group consisting of lead, tin, and alloys thereof.

6. A connection as claimed in claim 5 in which the metal coating has a metallurgical structure having an apparent hardness at least 20 percent less than the hardness of the metal when it is in normal foil form.

* * * * *